(No Model.)
W. H. WALKER.
SPRING JOINT FOR HOOKS, &c.
No. 320,729. Patented June 23, 1885.
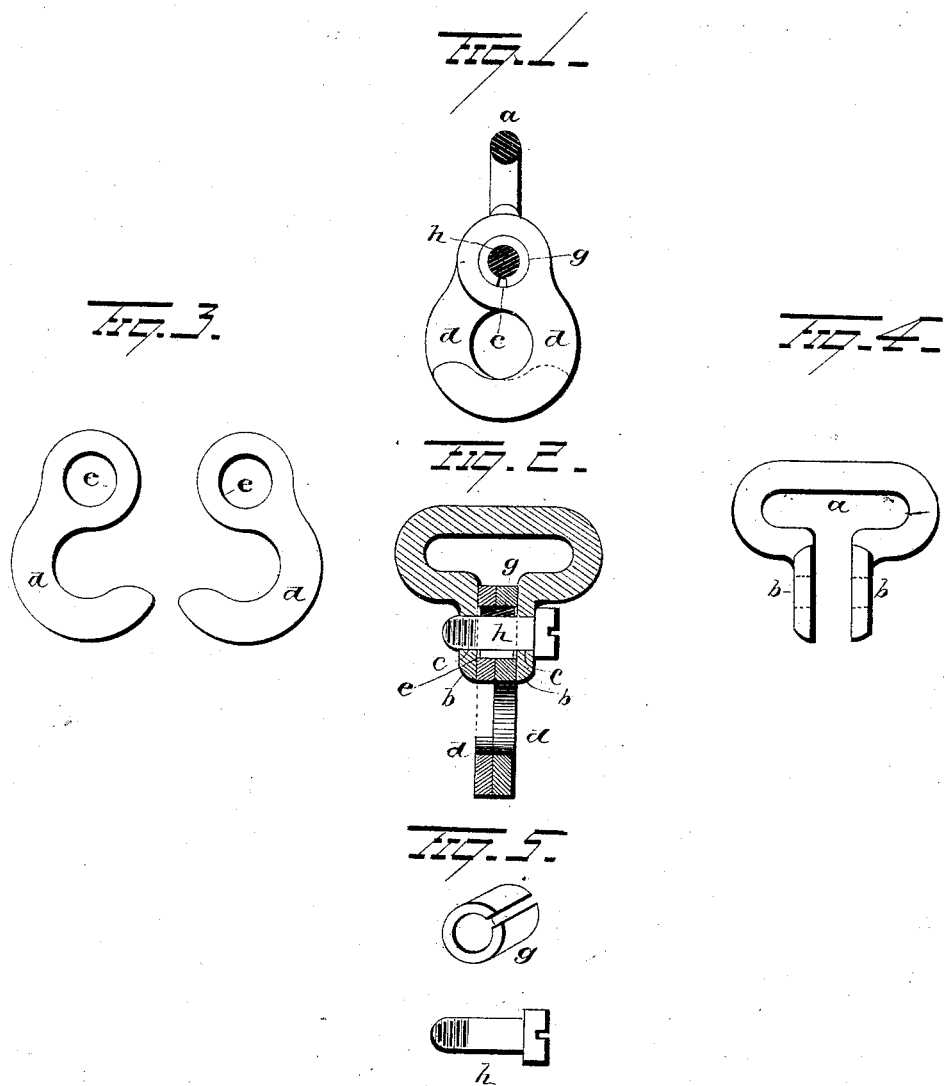
WITNESSES
E. J. Nottingham
Geo. F. Downing.
INVENTOR
W. H. Walker
By H. A. Seymour
ATTORNEY

UNITED STATES PATENT OFFICE.

WILLIAM H. WALKER, OF CHARLESTON, SOUTH CAROLINA.

SPRING-JOINT FOR HOOKS, &c.

SPECIFICATION forming part of Letters Patent No. 320,729, dated June 23, 1885.

Application filed August 9, 1884. (No model.)

*To all whom it may concern:*

Be it known that I, WILLIAM H. WALKER, of Charleston, in the county of Charleston and State of South Carolina, have invented certain new and useful Improvements in Spring-Joints for Hooks, Compasses, Dividers, and other similar Instruments; and I do hereby declare the following to be a full, clear, and exact description of the invention, such as will enable others skilled in the art to which it appertains to make and use the same.

My invention relates to an improvement in hooks, compasses, dividers, and other similar instruments in which it is desirable to have a device for regulating the movement of the parts relatively to each other, the object of the same being to provide instruments of the above character with a regulating device which shall be simple and economical in construction and durable and efficient in use.

With these ends in view my invention consists in the certain features of construction and combinations of parts, as will be fully described, and pointed out in the claims.

In the accompanying drawings, Figure 1 is a perspective view of a hook having my device applied thereto. Fig. 2 is a sectional view thereof; and Figs. 3, 4, and 5 are detached views of the several parts.

$a$ represents the shank of a hook, having the depending lugs $b$ provided with the holes $c$ in their ends, one of the said holes being screw-threaded to accommodate the end of a screw.

The arms $d$ are provided at their upper ends with the circular openings $e$, which are of corresponding size. The lower ends of the arms are curved and adapted when closed to overlap each other. The arms are adapted to be placed together and fit between the depending lugs $b$, with the openings $e$ thereof registering with the holes $c$ in the said lugs.

For the purpose of effectually securing the arms in any desired relative position, I provide an open band-ring, $g$, made of any suitable spring metal, and adapted to be forced in the openings $e$ of the arms $d$. The upper ends of the arms are placed between the lugs $b$, with the holes $e$ and $c$ registering with each other. The parts are secured in this position by means of a suitable screw, $h$, or other desired means.

The expansion of the ring $g$ causes the latter to bind against the walls of the openings $e$, and the frictional contact between the ring and hooks or arms $d$ is sufficient to lock said arms against accidental displacement. To adjust the hooks or arms, it is simply necessary to exert sufficient pressure thereagainst to overcome the frictional engagement between the hooks and the ring.

The spring $g$ should be slightly narrower than the combined depth or thickness of the openings $e$ of the arms or hooks, in order to avoid binding, which would follow if the spring $g$ were permitted to come in contact with the depending lugs $b$ of the shank of the hook.

I would have it understood that I do not limit the application of my invention to the device above described, but hold myself at liberty to apply the improvement to devices of any character where the same be found useful and applicable. As for instance, a rivet with disk clamp at either end may be used in place of screw as a pivot upon which the arms or legs of the instrument revolve.

Having fully described my invention, what I claim as new, and desire to secure by Letters Patent, is—

1. The combination, with two or more arms or hooks each provided with an opening, of an expansible ring located within said openings and a bolt or device for securing the parts together.

2. The combination, with two or more arms or hooks each provided with an opening, of an outwardly expanding split metal ring forced into said openings and a bolt or pin for securing the parts together.

3. A device for holding the lugs or arms of hooks, compasses, dividers, &c., in any desired position, consisting, essentially, of a split ring made of spring metal, and adapted to be forced into the openings in said legs or arms and surround the pivot-pin, substantially as set forth.

In testimony whereof I have signed this specification in the presence of two subscribing witnesses.

WM. H. WALKER.

Witnesses:
J. M. AXSON,
ANDREW MORELAND.